Nov. 6, 1928.
E. W. EHLERT
1,690,970
TRACTION DEVICE FOR VEHICLES
Filed June 1, 1927
3 Sheets-Sheet 1
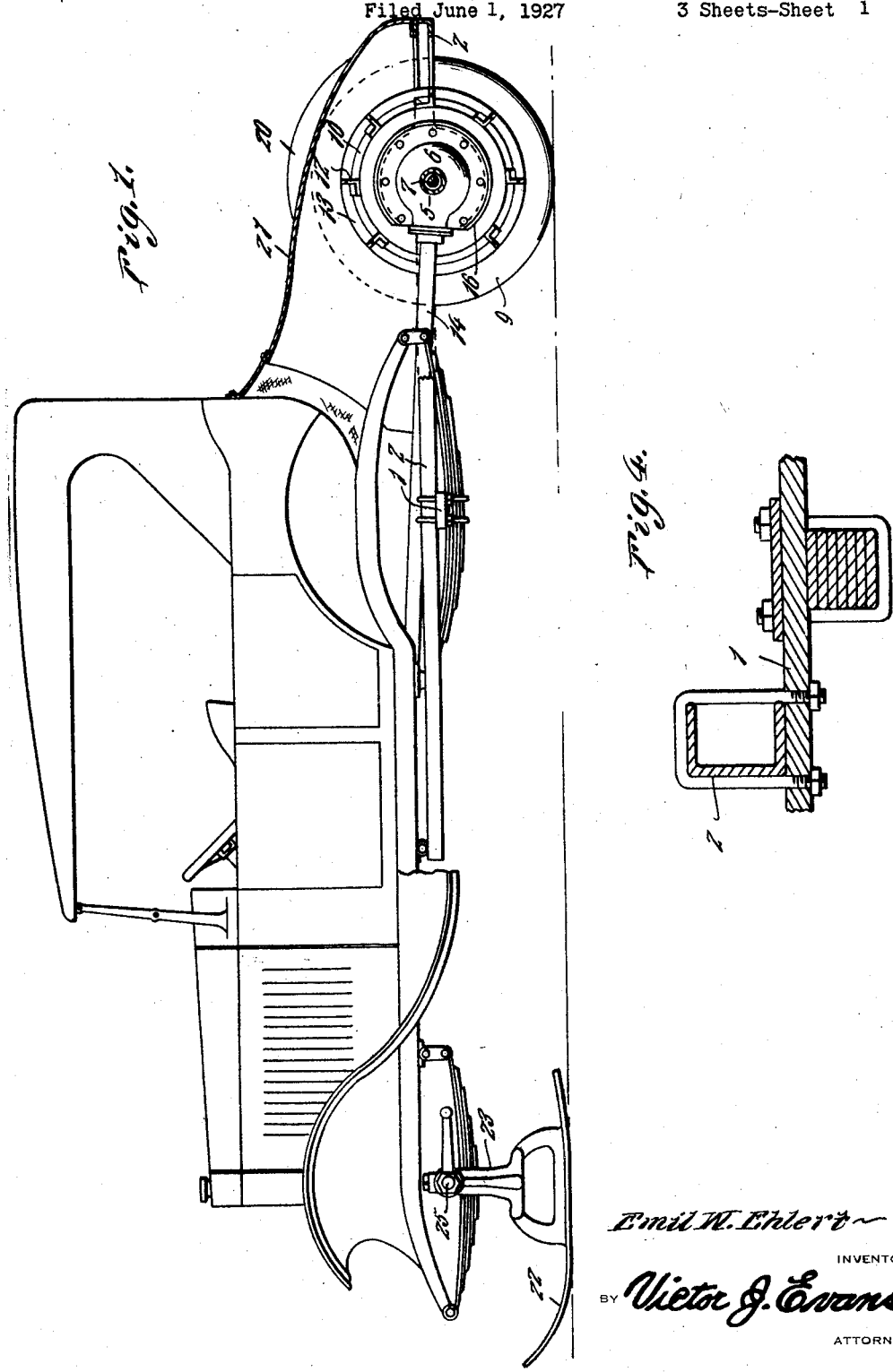

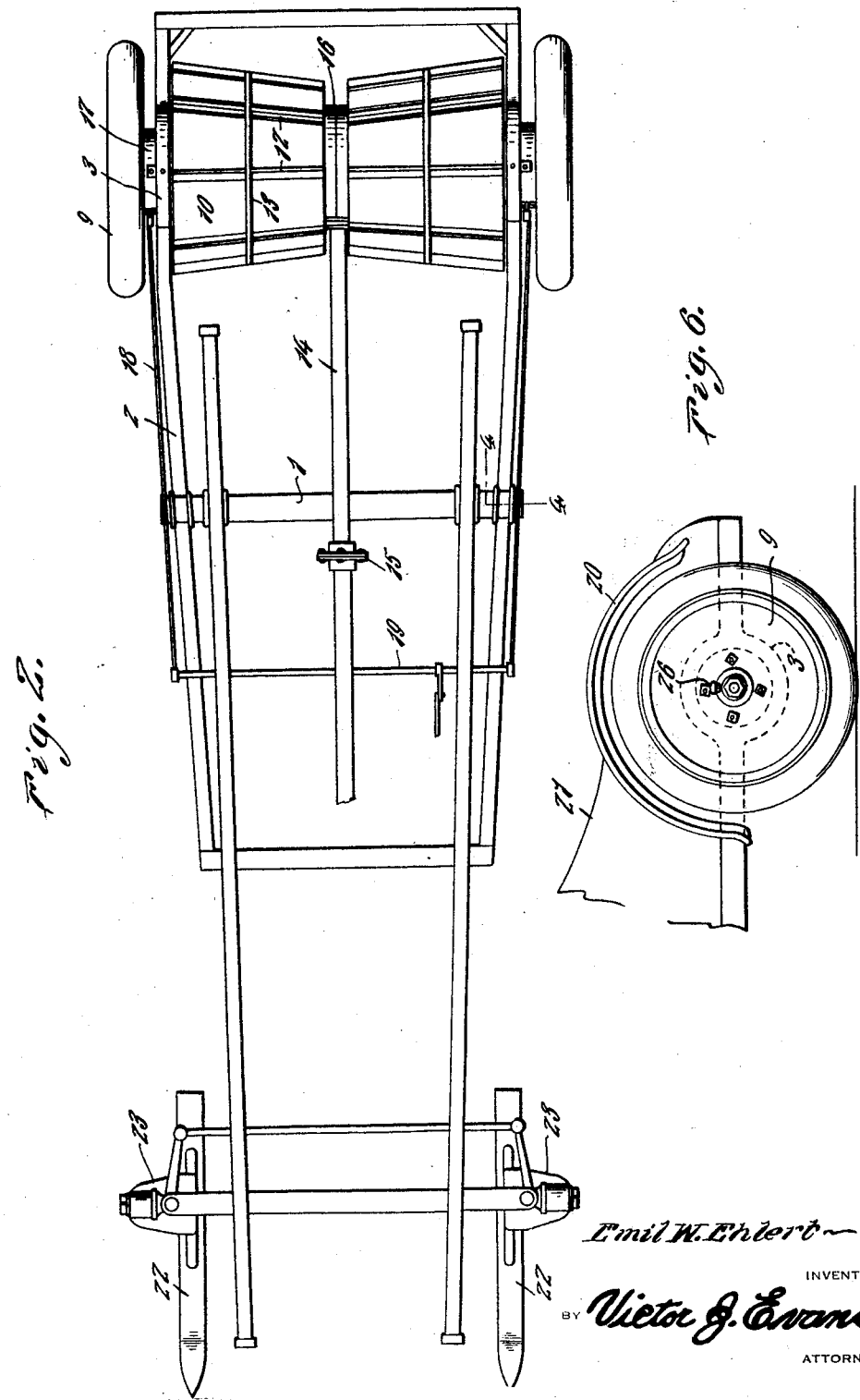

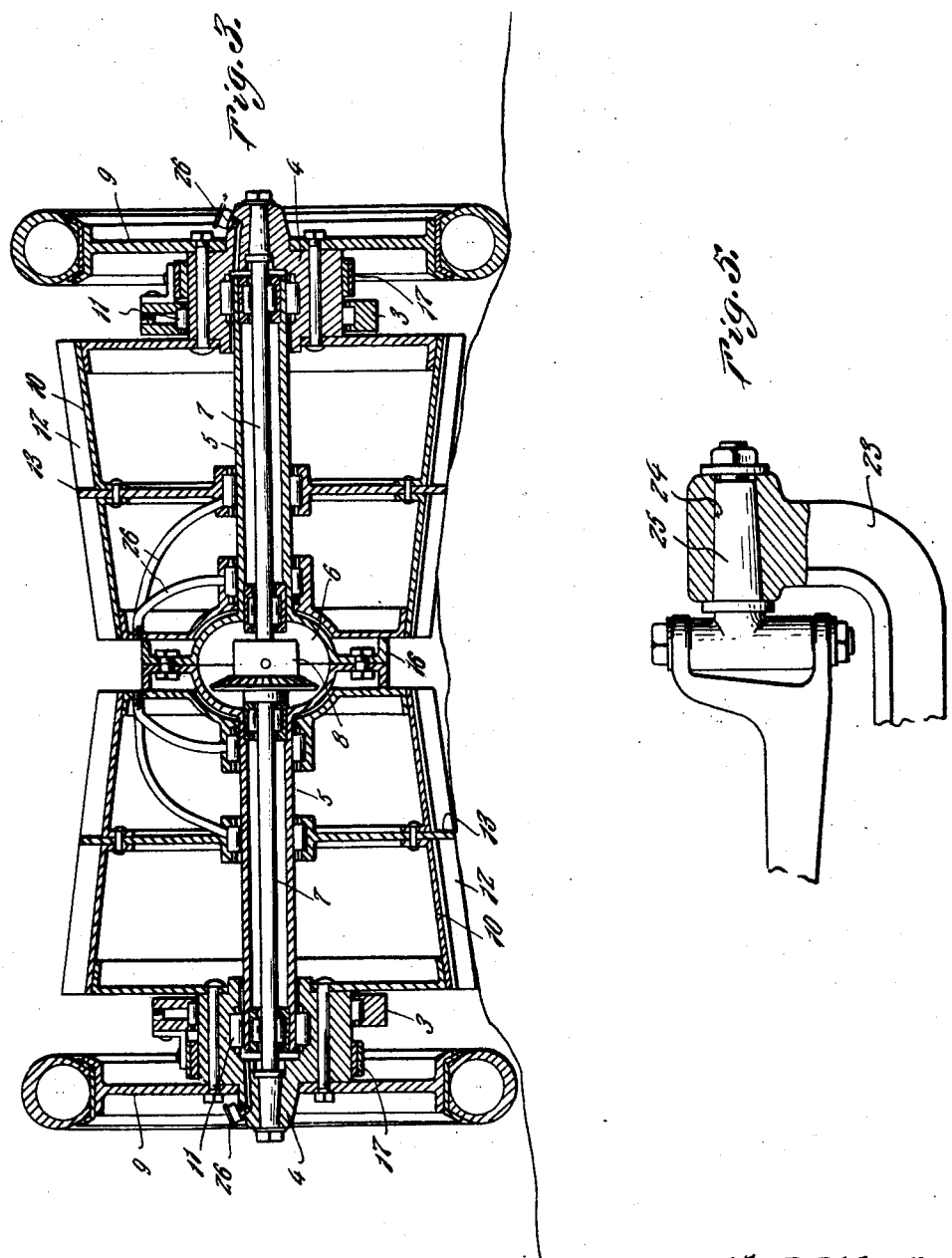

Patented Nov. 6, 1928.

1,690,970

UNITED STATES PATENT OFFICE.

EMIL W. EHLERT, OF THORP, WISCONSIN.

TRACTION DEVICE FOR VEHICLES.

Application filed June 1, 1927. Serial No. 195,736.

This invention relates to an attachment for a motor vehicle, the general object of the invention being to provide means for attaching drum-like wheels to the vehicle so that the vehicle can travel over snow covered roads as well as muddy and sandy roads, without difficulty.

A further object of the invention is to provide means whereby ordinary wheels can be associated with the drum-like wheels so that such drum-like wheels will not touch the road surface when the vehicle is traveling over hard road surfaces free or practically free of snow.

A still further object of the invention is to provide means whereby runners can be substituted for the front wheels when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view showing an automobile equipped with the invention.

Figure 2 is a plan view of the chassis of an automobile, showing the invention applied thereto.

Figure 3 is a longitudinal sectional view through that part of the invention which takes the place of the drive wheels of the vehicle.

Figure 4 is a section on line 4—4 of Figure 2.

Figure 5 is a view partly in section, showing how a runner is substituted for a front wheel.

Figure 6 is a fragmentary side view of the rear part of the vehicle.

As shown in these views, I remove the rear axle and its wheels from the vehicle and substitute therefor a cross bar 1 which supports portions of the side bars of an auxiliary frame 2, this frame also being attached to a part of the regular frame of the machine at its front end in any suitable manner. The frame 2 extends a considerable distance in rear of the main frame of the vehicle and its side bars have circular portions 3 for rotatably supporting the hubs 4, these hubs in turn being rotatably mounted on the ends of the hollow axle parts 5, the inner ends of which are enlarged to form the differential housing 6. A shaft 7 is journaled in each axle 5 and the inner ends of these shafts are connected together by the differential means 8. The outer ends of the shafts 7 are connected to the hubs in the usual manner and a tire carrying wheel 9 is bolted to each hub. An inwardly tapering drum 10 is also bolted to each hub and these drums rotate on the hollow axles 5 and have semi-circular recesses at their inner ends for receiving portions of the differential housing 6. Suitable anti-friction means are placed wherever necessary, as shown at 11.

Longitudinally extending lugs or blades 12 are fastened to the periphery of each drum to give the same traction and a circumferentially extending lug or blade 13 is also arranged on each drum to prevent sidewise slipping of the same. A shaft, enclosed in a housing 14, connects the differential means with the drive shaft of the vehicle, the housing 14 being connected with the housing of said drive shaft by the coupling 15. The abutting flanges of the differential housing are extended and bent at right angles to provide the guard 16 which prevents foreign matter from getting between the inner ends of the drums, as clearly shown in Figure 3. Each hub is provided with the brakes 17 which are connected by the rods 18 with the usual rock shaft 19 of the vehicle.

Thus it will be seen that the shafts 7 will be rotated when the power plant of the vehicle is in operation through the differential 8 so that the hubs and the wheels 9 and drums 10 will be rotated. It will also be seen that when the vehicle is traveling over a hard road free of snow, the tires on the wheels 9 will support the rear assembly, with the drums out of contact with the road surface, but when the vehicle is traveling over a snow covered road or one in which the wheels travel in ruts, the drums will engage the material at the center of the road and thus take the weight of the parts and give traction to the device even though the wheels 9 are not in contact with the road. The lugs 12 and 13 will prevent the drum from slipping or spinning and their broad road engaging surfaces will insure perfect traction. Figure 3 shows the drums engaging piled up snow or other material at the center of a road.

This invention will not only give the vehicle proper traction on roads covered with snow, or muddy roads, but it will also act to prevent parts of the chassis from dragging, as such parts will be carried well above the piled up material on the road between the wheels of the vehicle. The device will also act to pack snow on a road so that the road can be used by vehicles not equipped with the device.

The frame 2 carries the mudguards 20 for the wheels 9 and a flexible member 21 extends from the rear part of the attachment to the rear part of the automobile to enclose the parts.

I also provide a pair of runners 22 to be substituted for the front wheels when necessary or desirable, each runner being attached to an arm 23 which has a tapered opening 24 in its upper end for receiving the spindle 25 of the front axle.

Means for lubricating the various parts are indicated at 26.

It is thought from the foregoing description that the advantages and novel features of my invention will be readily apparent.

I desire it to be understood that I may make changes in the construction and in the combination of arrangement of the several parts, provided that such changes fall within the scope of the appended claims.

What I claim is:—

1. An attachment for a motor vehicle comprising a frame adapted to be connected to the rear part of the chassis of a motor vehicle, hubs rotatably mounted in the side members of the frame, hollow axles having their inner ends forming a differential housing with their outer ends rotatably supporting the hubs, a shaft in each housing, differential means connecting the inner ends of the shafts together, means for fastening the outer end of each shaft to a hub, a wheel connected with each hub, a drum rotatably mounted on each hollow axle and connected with a hub and means for connecting the differential means with the power plant of the vehicle.

2. An attachment for a motor vehicle comprising a frame adapted to be connected to the rear part of the chassis of a motor vehicle, hubs rotatably mounted in the side members of the frame, hollow axles having their inner ends forming a differential housing with their outer ends rotatably supporting the hubs, a shaft in each housing, differential means connecting the inner ends of the shafts together, means for fastening the outer end of each shaft to a hub, a wheel connected with each hub, a drum rotatably mounted on each hollow axle and connected with a hub, means for connecting the differential means with the power plant of the vehicle, brake means on the hubs, means for connecting the brake means with the brake operating means of the vehicle.

3. An attachment for a motor vehicle comprising a frame adapted to be connected to the rear part of the chassis of a motor vehicle, hubs rotatably mounted in the side members of the frame, hollow axles having their inner ends forming a differential housing with their outer ends rotatably supporting the hubs, a shaft in each housing, differential means connecting the inner ends of the shafts together, means for fastening the outer end of each shaft to a hub, a wheel connected with each hub, a drum rotatably mounted on each hollow axle and connected with a hub, means for connecting the differential means with the power plant of the vehicle, brake means on the hubs, means for connecting the brake means with the brake operating means of the vehicle, each drum tapering toward its inner end and transversely and circumferentially extending lugs on each drum.

In testimony whereof I affix my signature.

EMIL W. EHLERT